United States Patent [19]

Destryker et al.

[11] Patent Number: 5,279,768

[45] Date of Patent: Jan. 18, 1994

[54] PROCESS FOR THE PREPARATION OF ELECTRICALLY CONDUCTIVE POLYMERS DERIVED FROM 3-ALKYLTHIOPHENES

[75] Inventors: Elise Destryker, Sint-Pieters-Leeu; Claude Franquinet, Brussels; Etienne Hannecart, Tervuren, all of Belgium

[73] Assignee: Solvay & Cie (Societe Anonyme), Brussels, Belgium

[21] Appl. No.: 482,338

[22] Filed: Feb. 20, 1990

[30] Foreign Application Priority Data

Feb. 20, 1989 [FR] France .................. 89 02267
Nov. 17, 1989 [BE] Belgium .................. 08901231

[51] Int. Cl.$^5$ .................................... H01B 1/12
[52] U.S. Cl. ........................ 252/500; 252/518; 526/256; 528/378; 528/380; 524/435
[58] Field of Search ............. 252/500, 518; 526/256; 528/378, 380; 524/435

[56] References Cited

U.S. PATENT DOCUMENTS

| | | | |
|---|---|---|---|
| 4,547,270 | 10/1985 | Naarman | 252/500 |
| 4,599,194 | 7/1986 | Frommer et al. | 252/500 |
| 4,697,000 | 9/1987 | Witucki et al. | 252/500 |
| 4,781,443 | 11/1988 | Giles | 252/500 |
| 4,818,646 | 4/1989 | Takakubo et al. | 252/518 |
| 4,847,115 | 7/1989 | Warren et al. | 252/500 |
| 4,892,678 | 1/1990 | Tanaka et al. | 252/500 |
| 4,909,959 | 3/1990 | Lemaire et al. | 252/500 |
| 4,959,162 | 9/1990 | Armes et al. | 252/500 |
| 4,959,430 | 9/1990 | Jonas et al. | 528/378 |
| 4,975,222 | 12/1990 | Yoshino et al. | 252/500 |
| 4,985,124 | 1/1991 | Claussen et al. | 204/72 |
| 4,986,886 | 1/1991 | Wei et al. | 526/256 |
| 5,109,109 | 4/1992 | Hotta et al. | 528/380 |
| 5,158,707 | 10/1992 | Vestberg et al. | 252/518 |

FOREIGN PATENT DOCUMENTS

| | | |
|---|---|---|
| 0253594 | 1/1988 | European Pat. Off. . |
| 0267392 | 5/1988 | European Pat. Off. . |
| 0280173 | 8/1988 | European Pat. Off. . |
| 3425511 | 1/1986 | Fed. Rep. of Germany . |
| 61-111324 | 5/1986 | Japan . |
| 63-178442 | 1/1987 | Japan . |
| 62-115426 | 5/1987 | Japan . |
| 87/05914 | 10/1987 | PCT Int'l Appl. . |
| 2184738 | 1/1987 | United Kingdom . |

OTHER PUBLICATIONS

Yoshino et al., "Fusibility of Polythiophene derivatives . . . " *JJAP* 26(6) Jun. 1987 pp. L1038–L1039.

Makromolekulare Chemie, vol. 5, No. 3, Mar. 1984, pp. 157–164, Heidelberg DE; W. Wernet et al.: "A new series of conducting polymers with layered structure: Polyprrole n-alkylsulfates and n-alkylsulfonates", pp. 157 and 158.

Journal of Colloid and Interface Science, vol. 118, No. 2, Apr. 1987, pp. 411–416, S. P. Armes et al.

Chemical Abstracts, vol. 109, No. 22, Nov. 1988, p. 649, Resume No. 199773b, Columbus, Ohio, US; J. R. Reynolds et al.: "Self-doped conducting copolymers. A charge and mass transport study of poly(pyrrole-1-yl)-propanesulfonate".

Japanese Journal of Applied Physics/Part 2; Letters, vol. 26, No. 6, Jun. 1987, pp. L1038–L1039.

Chemical Abstracts, vol. 106, No. 12, Mar. 23, 1987, p. 6

Chemical Patents Index, Basic Abstracts Journal, Dec. 1987

*Primary Examiner*—Christine Skane
*Assistant Examiner*—Bradley A. Swope
*Attorney, Agent, or Firm*—Willian Brinks Hofer Gilson & Lione

[57] ABSTRACT

The invention relates to a process for the preparation of electrically conductive polymers derived from 3-alkyl-thiophenes by chemical polymerization of the 3-alkyl-thiophene by means of a ferric salt, an alkyl halide and water.

The invention also relates to electrically conductive devices containing the poly(3-alkylthiophenes) obtained and a thermoplastic polymer.

24 Claims, No Drawings

PROCESS FOR THE PREPARATION OF ELECTRICALLY CONDUCTIVE POLYMERS DERIVED FROM 3-ALKYLTHIOPHENES

BACKGROUND OF THE INVENTION

1. Field of the Invention

The present invention relates to a process for the preparation of electrically conductive polymers derived from 3-alkylthiophenes by chemical polyemerization of the corresponding 3-alkylthiophene.

2. Discussion of Related Art

In Patent Application EP-0,253,594 a process has been proposed for the preparation of electrically conductive polymers by chemical polymerization of thiophenes which can be substituted, by various substituted aminoalkyl or oxyalkyl groups, in the presence of an oxidizing agent having a standard redox potential greater than or equal to that of the substituted thiophene and, if appropriate, in the presence of a catalyst and of a solvent at a temperature of between 20° and 110° C. The polymers obtained can be mixed with other polymers such as polyvinyl chloride and polyethylene, but the conductive polymers and the mixtures obtained by this process have low conductivities (of the order of 1 to $10^{-6}$ S.cm$^{-1}$).

SUMMARY OF THE INVENTION

A process has now been found for the preparation of poly(3-alkylthiophenes) by chemical polymerization of the corresponding 3-alkythiophene, enabling large amounts of homogeneous conductive polymers, which have properties of high electrical conductivity and are stable to heat, to be obtained with a high degree of conversion. The poly(3-alkylthiophenes) thus obtained can be employed easily. Moreover, after using mixtures of the poly(3-alkylthiophene) obtained according to the process of the invention and resins, such as polyvinyl chloride or polyethylene, the composites obtained show a good dispersion and a satisfactory mechanical and thermal resistance, which features it has not been possible to obtain with the known (3-alkyl)thiophene polymers.

To this end, the present invention relates to a process for the preparation of electrically conductive polymers derived from 3-alkylthiophenes by chemical polymerization of the corresponding 3-alkylthiophene in a reaction medium comprising a ferric salt, an alkyl halide and water.

DETAILED DISCUSSION OF PREFERRED EMBODIMENTS

Electrically conductive polymers derived from 3-alkylthiophenes, which are also termed poly(3-alkylthiophenes), are understood to be polymers containing recurring units derived from 3-alkylthiophene in which the alkyl substituent contains from six to nine carbon atoms and copolymers containing thiophene units and units derived from 3-alkylthiophene in which the alkyl substituent contains from six to nine carbon atoms. Customarily, in the case of copolymers, the quantity of unsubstituted thiophene units is less than 50% and preferably less than 30% of the total polymer units. The alkyl substituent can be chosen from straight-chain or branched $C_6$ to $C_9$ alkyl radicals. Preferably, polymers containing recurring units of 3-n-octylthiophene are used.

In the process according to the invention, the reaction mixture can, because of the presence of water, consist of a homogeneous phase or of several distinct phases. It is preferred to work with a reaction mixture consisting of a phase which is the most homogeneous possible.

In the reaction medium a ferric salt is used as a doping agent and agent initiating polymerization. In general, an organic or inorganic ferric salt is used. Customarily, an inorganic ferric salt such as a chloride, a sulphate or a nitrate is used. Ferric chloride is preferably used. The ferric salt can be introduced in the anhydrous or hydrated form; the water introduced by the hydrated ferric salt forms part of the reaction medium and is taken into account when calculating the ratios with the other additives.

An alkyl halide containing from 1 to 10 carbon atoms is generally used in the reaction medium. Customarily, a straight-chain or branched alkyl halide containing from 1 to 8 carbon atoms is used, the halide being a chloride or a fluoride. A straight-chain alkyl chloride containing from 1 to 4 carbon atoms is preferably used. Particularly preferentially, chloroform or methylene chloride is used.

The amount of alkyl halide used in the process according to the invention is generally between 0.001 and 1 liter per g of 3-alkylthiophene, customarily between 0.002 and 0.8 liter per g of 3-alkylthiophene and preferably between 0.003 and 0.5 liter per g of 3-alkylthiophene.

The molar ratio between the ferric salt and the 3-alkylthiophene used in the process according to the invention is generally between 1 and 25. Customarily, this ratio is between 5 and 20 and preferably between 10 and 15.

The amount of water in the process according to the invention is significant and is generally between 0.002 and 900% by weight of alkyl halide, customarily between 0.01 and 500% and preferably between 0.1 and 250% by weight of alkyl halide.

The molar ratio between the water and the ferric salt is an important characteristic for the invention. This ratio is generally between 0.01 and 6, customarily between 0.1 and 5 and preferably between 0.3 and 4.

The chemical polymerization reaction is customarily carried out under an atmosphere of air or nitrogen and preferably under a nitrogen atmosphere.

The pressure at which the process is carried out is generally between 0.1 and 10 bar and it is preferably atmospheric pressure.

The temperature at which the polymerization process is carried out is critical if the process according to the invention is to proceed well and is generally between 0° and 15° C., customarily between 1° and 12° C. and preferably between 2° and 10° C. when the process is carried out under atmospheric pressure.

The process according to the invention can advantageously be carried out following the following steps:
- during a first step, a fraction of the necessary amount of alkyl halide and ferric salt is introduced into the reactor under a nitrogen atmosphere;
- during a second step, the appropriate amount of water and the 3-alkylthiophene dissolved in the necessary amount of alkyl halide are added separately, with stirring, the desired polymer being obtained;
- during a third step, the polymer obtained is washed and then dried.

During the second step, it is particularly advantageous to introduce the water and the 3-alkylthiophene dissolved in the alkyl halide in a continuous and regular manner.

During the third step, the polymer obtained is preferably washed with acetonitrile.

The process according to the invention can be carried out in any equipment or any reactor enabling the operating conditions described above to be combined.

The poly(3-alkylthiophenes) obtained according to the process of the invention can easily be dispersed in diverse polymer resins and easily used. In fact, the polymers according to the invention and their mixtures with thermoplastic polymers such as polyvinyl chloride, polyethylene or the copolymer of ethylene and vinyl acetate can be malaxated and hot-pressed to obtain composite sheets or articles. These composite sheets or articles have a good mechanical and thermochemical resistance. In contrast to the composite articles produced with conductive polymers obtained by the electrochemical route, they have a high residual electrical conductivity which is stable with time. These composite sheets or articles are homogeneous because the poly(3-alkylthiophenes) can be malaxated and mixed hot without loss of electrical conductivity.

Contrary to what has been observed with the thiophene polymers obtained by the known processes, which lose their electrical conductivity and must be redoped after hot pressing and/or mixing, the malaxating of the poly(3-alkylthiophenes) obtained according to the process of the invention does not cause any reduction in the electrical conductivity but, on the contrary, gives rise to a tendency to enhance this property.

The composite sheets or articles can be loaded, in particular, with glass fibres, carbon black, calcium carbonate or metal particles.

The invention thus also relates to compositions comprising the poly(3-alkylthiophenes) and one or more thermoplastic polymers and to the electrically conductive devices containing these compositions.

The poly(3-alkylthiophenes) obtained according to the process of the invention can be dissolved in an organic solvent.

Examples of solvents which can be used are chlorobenzene, acetone and nitrobenzene. Nitrobenzene is preferably used.

The solution thus obtained, when heated, can be spread on numerous supports, such as glass, metals, metallized glass, polyester, glass fibres, textiles and plastic materials. Regular, homogeneous and conductive thin layers a few microns thick (from 0.2 to a few tens of microns) are thus obtained which adhere to these supports.

Finally, the poly(3-alkylthiophenes) and the compositions containing the poly(3-alkylthiophenes) obtained according to the process of the invention can be used for their electrical conductivity, electromagnetic absorption and thermoconductivity properties and more particularly to produce electrically conductive devices.

The invention is illustrated by the following examples.

EXAMPLE 1

The reactor used is a 5-necked 3 l flask fitted with, respectively, a 3-way tap, a thermometer, a 250 ml reservoir fitted with a tap and surmounted by a 3-way tap, a septum enabling a needle connected to a 50 ml metering syringe to be set up and a stirrer.

This flask fitted with a stirrer is placed in a thermostat-controlled bath and is purged by a cycle of 3 applications of vacuum and 2 flushings with pure and dry nitrogen.

850 ml of chloroform, previously degassed with nitrogen, are then introduced into this flask, which is kept at 5° C. under nitrogen, and 94 g of anhydrous ferric chloride are then added, with stirring.

The metering syringe is then filled with 20 ml of demineralized and degassed water and the reservoir fitted with a tap is then filled with 150 ml of chloroform and 11 g of distilled and degassed 3-n-octylthiophene.

The water, with the aid of the syringe, and the chloroform and the 3-n-octylthiophene, with the aid of the reservoir fitted with a tap, are introduced into the flask in parallel and in the course of 10 minutes.

The flask is then stirred for a further two hours at 5° C., after which 150 ml of acetonitrile are introduced very slowly in the course of 45 minutes into this flask kept at 5° C.

The mixture is then stirred for 10 minutes.

The product is then filtered in air at 20° C.

The product obtained is washed 3 times with 250 ml of acetonitrile at 20° C. and then dried under a dynamic vacuum at 20° C.

Finally, 12 g of doped poly(3-n-octylthiophene) are obtained which has a conductivity of 25 S.cm$^{-1}$ and a degree of conversion:

$$\left[\frac{\text{(poly)octylthiophene polymer calculated as non-doped}}{\text{3-n-octylthiophene monomer}}\right] \text{ of } 80.5\%$$

EXAMPLE 2

1 g of polyvinyl chloride (PVC sold under the name SOLVIC 271 GB number K71) is mixed with 9 g of poly(3-n-octylthiophene) as obtained in Example 1.

The mixture is malaxated at 180° C. for 2.5 minutes and then pressed at 180° C. for 1 minute under a pressure of one tonne per cm$^2$.

The thin sheet obtained has a conductivity of 42 S.cm$^{-1}$.

EXAMPLE 3

10 g of poly(3-n-octylthiophene), as obtained in Example 1, are malaxated at 180° C. for 2.5 minutes and then pressed at 180° C. for 1 minute under a pressure of one tonne per cm$^2$.

The thin sheet obtained has a conductivity of 40 S.cm$^{-1}$.

EXAMPLE 4

Example 2 is repeated using 2 g of polyvinyl chloride and 8 g of poly(3-n-octylthiophene) as obtained in Example 1.

The thin sheet obtained has a conductivity of 29 S.cm$^{-1}$.

EXAMPLE 5

10 g of poly(3-n-octylthiophene) as obtained in Example 1 and 1 l of nitrobenzene ppa are introduced into a flask fitted with a stirrer, placed in a thermostat-controlled flask, kept under nitrogen and fitted with a condenser.

The mixture is heated at 140° C. for one hour.

The hot solution is centrifuged at 10,000 revolutions per minute for 3 minutes.

The supernatant liquor is withdrawn under nitrogen and the solution is then left to stand for 4 hours at ambient temperature.

The product obtained is spread on glass and on polyester with the aid of a doctor blade and then dried in a vacuum oven (20 mmHg, 50° C., 30 minutes).

The characteristics of the films obtained are collated in Table 1.

TABLE 1

| Support | Thickness μm | Conductivity S.cm$^{-1}$ | Adherence (*) |
|---|---|---|---|
| Polyester | 1.1 | 50 | A3 |
| Glass | 1.0 | 60 | A1 |

(*) The adherence is measured in accordance with ASTM standard D 3359-78 A which employs a test with 3M Scotch tape no. 710 (American National Standard).

EXAMPLE 6R (COMPARISON)

A reactor similar to that used in Example 1 is used.

850 ml of anhydrous chloroform, previously degassed with nitrogen, are introduced into this flask, which is kept at 5° C. under nitrogen, and 94 g of anhydrous ferric chloride are then added, with stirring.

150 ml of chloroform and 11 g of distilled and degassed 3-n-octylthiophene are then introduced into the flask.

The flask is then kept at 5° C., with stirring, for 2 hours. 150 ml of acetonitrile are then introduced very slowly in the course of 45 minutes into this flask which is kept at 5° C.

The mixture is then stirred for 10 minutes.

The product is then filtered in air at 20° C.

The product obtained is washed 3 times with 250 ml of acetonitrile at 20° C. and then dried under dynamic vacuum at 20° C.

Finally 10.9 g of doped poly(3-n-octylthiophene) are obtained which has an electrical conductivity of 5 S.cm$^{-1}$.

EXAMPLE 7

The reactor used is a 5-necked 3 l flask fitted with, respectively, a 3-way tap, a thermometer, a septum enabling needles connected to metering pumps to be set up and a stirrer.

This flask fitted with a stirrer is placed in a thermostat-controlled bath and is purged by a cycle of 3 applications of vacuum and 2 flushings with pure and dry nitrogen.

750 ml of chloroform previously degassed with nitrogen are then introduced into this flask, which is kept at 5° C. under nitrogen, and 750 g of anhydrous ferric chloride are then added, with stirring.

A 500 ml vessel is then filled under nitrogen with 250 ml of chloroform and 92 g of distilled and degassed 3-n-octylthiophene.

With the aid of the metering pumps, 160 ml of water are introduced into the flask in the course of 5 minutes and, in parallel, the chloroform and the 3-n-octylthiophene, contained in the vessel, are introduced into the flask in the course of 10 minutes.

The flask is then kept at 5° C., with stirring, for two hours, after which 1 l of acetonitrile is introduced very slowly in the course of 80 minutes into this flask which is kept at 5° C.

The product is then filtered at 20° C. under nitrogen.

The product obtained is washed 5 times with 500 ml of acetonitrile at 20° C. and then dried under a dynamic vacuum at 20° C.

Finally 99 g of doped poly(3-n-octylthiophene) are obtained which has a conductivity of 37 S.cm$^{-1}$ and a degree of conversion:

$$\left[\frac{\text{(poly)octylthiophene polymer calculated as non-doped}}{\text{3-n-octylthiophene monomer}}\right] \text{of } 80\%$$

EXAMPLE 8R (COMPARISON)

Example 7 is repeated but without introducing water.

65 g of doped poly(3-n-octylthiophene) are obtained which has a conductivity of 0.2 S.cm$^{-1}$ with a degree of conversion of 55%.

EXAMPLE 9

The reactor used is a 5-necked 3 l flask fitted with, respectively, a 3-way tap, a thermometer, a septum enabling needles connected to metering pumps to be set up and a stirrer.

This flask fitted with a stirrer is placed in a thermostat-controlled bath and is purged by a cycle of 3 applications of vacuum and 2 flushings with pure and dry nitrogen.

750 ml of chloroform previously degassed with nitrogen are then introduced into this flask, which is kept at 5° C. under nitrogen, and 561 g of anhydrous ferric chloride are then added, with stirring.

A 500 ml vessel is then filled under nitrogen with 250 ml of chloroform and 69 g of distilled and degassed 3-n-octylthiophene.

With the aid of the metering pumps, 120 ml of water are introduced into the flask in the course of 5 minutes and, parallel with this, the chloroform and the 3-n-octylthiophene contained in the vessel, are introduced into the flask in the course of 10 minutes.

The flask is then kept at 5° C., with stirring, for a further two hours, after which 1 l of acetonitrile is introduced very slowly in the course of 80 minutes into this flask which is kept at 5° C.

The product is then filtered at 20° C. under nitrogen.

The product obtained is washed 5 times with 500 ml of acetonitrile at 20° C. and then dried under a dynamic vacuum at 20° C.

Finally 75 g of doped poly(3-n-octylthiophene) are obtained which has a conductivity of 30 S.cm$^{-1}$ and a degree of conversion:

$$\left[\frac{\text{(poly)octylthiophene polymer calculated as non-doped}}{\text{3-n-octylthiophene monomer}}\right] \text{of } 80\%.$$

What is claimed is:

1. A process for the preparation of an electrically conductive polymer derived from a 3-alkylthiophene, comprising polymerizing the 3-alkylthiophene chemically in a reaction medium comprising an anhydrous ferric salt, an alkyl halide solvent and water; wherein the amount of water is between 0.01 and 500% by weight of the alkyl halide and wherein the amount of the alkyl halide is between 0.001 and 1 liter per gram of the 3-alkylthiophene.

2. A process according to claim 1, wherein the molar ratio between the water and the ferric salt is between 0.1 and 6.

3. A process according to claim 1, wherein the alkyl halide is selected from the group consisting of chloroform and methylene chloride.

4. A process according to claim 1, wherein the ferric salt is ferric chloride.

5. A process according to claim 1, wherein the molar ratio between the ferric salt and the 3-alkylthiophene is between 1 and 25.

6. A process according to claim 1, conducted at the temperature of between 0° and 15° C.

7. A process according to claim 1, further comprising mixing the polymer with a thermoplastic polymer selected from the group consisting of polyvinyl chloride, polyethylene and a copolymer of ethylene and vinyl acetate, and malaxating and hot-pressing the thus obtained mixture.

8. A process according to claim 1, wherein the 3-alkylthiophene is 3-n-octylthiophene.

9. A process according to claim 1, wherein the alkyl substituent of the 3-alkylthiophene is a straight chain or branched chain $C_6$-$C_9$ alkyl radical.

10. A process according to claim 9, wherein the polymer is selected from the group consisting of a homopolymer of the 3-alkylthiophene or a copolymer containing thiophene units and units derived from 3-alkylthiophene in which the alkyl substituent is a straight chain or branched $C_6$-$C_9$ alkyl radical.

11. A process according to claim 10, wherein the polymer is the copolymer comprising less than 50% of the thiophene units, of the total polymer units.

12. A process according to claim 11, wherein the polymer is the copolymer comprising less than 30% of the thiophene units, of the total polymer units.

13. A process according to claim 1, wherein the ferric salt is an organic or inorganic ferric salt.

14. A process according to claim 13, wherein the ferric salt is an inorganic ferric salt.

15. A process according to claim 14, wherein the inorganic ferric salt is a ferric chloride, a ferric sulphate or a ferric nitrate.

16. A process according to claim 1, wherein the alkyl halide contains 1 to 10 carbon atoms.

17. A process according to claim 16, wherein the alkyl halide contains 1 to 4 carbon atoms.

18. A process according to claim 2, wherein the molar ratio between the water and the ferric salt is between 0.1 and 5.

19. A process according to claim 18, wherein the molar ratio between the water and the ferric salt is between 0.3 and 4.

20. A process according to claim 1, wherein the amount of the water is between 0.1 and 250% by weight of the alkyl halide.

21. A process according to claim 6 conducted at the temperature of between 2° and 10° C.

22. A process for preparation of an electrically conductive polymer derived from a 3-alkylthiophene, comprising polymerizing the 3-alkylthiophene chemically in a reaction medium comprising an anhydrous ferric salt, an alkyl halide solvent and water; said process conducted at the molar ratio between the water and the ferric salt of between 0.01 and 6; the alkyl halide is selected from the group consisting of chloroform and methylene chloride;

the anhydrous salt is anhydrous ferric chloride; the molar ratio between the anhydrous ferric chloride and the 3-alkylthiophene is between 1 and 25; the amount of the alkyl halide is between 0.001 and 1 liter per gram of the 3-alkylthiophene; the amount of the water is between 0.01 and 500% by weight of alkyl halide; and the temperature is between 0° and 15° C.

23. A process according to claim 22, further comprising mixing the polymer with a thermoplastic polymer selected from the group consisting of polyvinyl chloride, polyethylene and a copolymer of ethylene and vinyl acetate, and malaxating and hot-pressing the thus obtained mixture.

24. A process according to claim 23, wherein the 3-alkylthiophene is 3-n-octylthiophene.

* * * * *